(12) United States Patent
Oberndorfer et al.

(10) Patent No.: US 9,731,374 B2
(45) Date of Patent: Aug. 15, 2017

(54) WELDING TORCH

(71) Applicant: FRONIUS INTERNATIONAL GMBH, Pettenbach (AT)

(72) Inventors: Klaus Oberndorfer, Vorchdorf (AT); David Preundler, Neukirchen an der Vöckla (AT); Stefan Puehringer, Vorchdorf (AT); Anton Preundler, Wankham (AT)

(73) Assignee: Fronius International GmbH, Pettenbach (AT)

( * ) Notice: Subject to any disclaimer, the term of this patent is extended or adjusted under 35 U.S.C. 154(b) by 349 days.

(21) Appl. No.: 14/197,472

(22) Filed: Mar. 5, 2014

(65) Prior Publication Data
US 2014/0251973 A1 Sep. 11, 2014

(30) Foreign Application Priority Data
Mar. 6, 2013 (AT) ................ A 50148/2013

(51) Int. Cl.
*B23K 9/28* (2006.01)
(52) U.S. Cl.
CPC .................... *B23K 9/285* (2013.01)
(58) Field of Classification Search
CPC .... B23K 9/285; B23K 9/295; B23K 26/1461; B23K 26/1476; H05H 1/34; H05H 2001/3457
See application file for complete search history.

(56) References Cited

U.S. PATENT DOCUMENTS

| 5,349,158 A | 9/1994 | Mari |
| 5,873,531 A * | 2/1999 | Wang .................... B05B 1/1654 239/394 |
| 5,874,707 A | 2/1999 | Iida et al. |
| 7,322,535 B2 * | 1/2008 | Erdely .................. B05B 1/1654 239/391 |
| 2006/0163387 A1 | 7/2006 | Erdely |
| 2007/0215587 A1 * | 9/2007 | Centner ................. B23K 9/295 219/137.62 |
| 2012/0012560 A1 * | 1/2012 | Roberts .................... H05H 1/34 219/74 |

(Continued)

FOREIGN PATENT DOCUMENTS

| CN | 101107077 A | 1/2008 |
| CN | 101823176 A | 9/2010 |

(Continued)

OTHER PUBLICATIONS

German Examination Report in 10 2014 203 600.3, dated Nov. 4, 2014, with English translation.

(Continued)

*Primary Examiner* — Brian Jennison
(74) *Attorney, Agent, or Firm* — Collard & Roe, P.C.

(57) ABSTRACT

A cooled welding torch (1) having a cooling circuit, which cooling circuit extends via a nozzle fitting receiver (3) into a gas nozzle (9), and the gas nozzle (9) is attachable to the welding torch (1) by a defined turn, wherein the cooling circuit is routed through a redirecting element (5), which redirecting element (5) is positioned above the nozzle fitting receiver (3) and may be turned together with the gas nozzle (9), wherein a path of the cooling circuit is switchable by the position of the gas nozzle (9).

12 Claims, 8 Drawing Sheets

(56) References Cited

U.S. PATENT DOCUMENTS

2013/0019975 A1* 1/2013 Chen .................... E03C 1/0404
137/801

FOREIGN PATENT DOCUMENTS

| CN | 102248264 A | 11/2011 |
|---|---|---|
| CN | 102407399 A | 4/2012 |
| DE | 2 243 924 A1 | 3/1974 |
| DE | 235 582 A1 | 5/1986 |
| DE | 42 29 227 C1 | 9/1993 |
| JP | S57-199578 A | 12/1982 |
| JP | S59-42185 A | 3/1984 |
| JP | S60-9586 A | 1/1985 |
| JP | H01202376 A | 8/1989 |

OTHER PUBLICATIONS

Austrian Preliminary Office Action dated Nov. 12, 2013 in Austrian Application No. A 50148/2013 with English of relevant parts of same translation.
Chinese Office Action in Chinese Application No. 201410079170.3 dated Dec. 14, 2016 with English translation.

* cited by examiner

WELDING TORCH

CROSS REFERENCE TO RELATED APPLICATIONS

Applicant claims priority under 35 U.S.C. §119 of Austrian Application No. A 50148/2013 filed on Mar. 6, 2013, the disclosure of which is incorporated by reference.

The invention relates to a cooled welding torch having a cooling circuit comprising a coolant supply line and a coolant return line, the cooling circuit extending via a nozzle fitting receiver into a gas nozzle, and the gas nozzle being attached to the welding torch by a defined turn.

Different cooled welding torches are known from the prior art. For example, a gas-shielded welding torch having a cooling circuit extending to the nozzle head is known from DE 42 29 227 C1. The welding torch has a water supply line and a water return line as well as a bypass, making it possible to connect the water supply line and the water return line upstream of the torch neck to form a parallel fluidic connection for the water supplied. In addition, valves for locking the water supply and the water return are provided. Furthermore, DD 235 582 A1 shows a method for regulating the cooling water flow in a welding torch, wherein the cooling water flow is enabled or turned off and/or redirected by means of a solenoid switch.

In general, different types of cooled welding torches in which the cooling circuit is formed by a coolant supply line and a coolant return line are known, with the cooling circuit extending to the gas nozzle in order to subsequently cool the gas nozzle. A specific disadvantage in the known versions is coolant leaking as a result of removing the cooled gas nozzle. When removing the gas nozzle, the leaking of coolant is inevitable because coolant is still present in the gas nozzle and/or in the supply and return line at this point in time.

Based on the prior art, the basic object of the invention is to provide a cooled welding torch which maintains a cooling circuit permanently, even when the gas nozzle is removed, and prevents the leaking of coolant at the same time.

According to the invention, this object is accomplished by creating either a shortened cooling circuit or an expanded cooling circuit, depending on the position of the gas nozzle. In this respect, it is relevant to turn a redirecting element together with the gas nozzle at the same time, the redirecting element making it possible to create either a shortened or an expanded cooling circuit, on the one hand, and to prevent a leaking of coolant and/or water, on the other hand, by the redirecting element remaining in the same axial position and only changing its radial turning position. A coolant flow in the redirecting element is guaranteed at all times, even when the gas nozzle has been removed. This is possible because the redirecting element and the gas nozzle are turned together, but not removed together. By means of the welding torch according to the invention, the disadvantages of the previously used welding torches are avoided while advantageous solutions are implemented at the same time. The associated dependent claims specify favourable enhancements.

It has been proven particularly advantageous to design the invention as defined in the independent claim. To this effect, the object according to the invention is a cooled welding torch having a cooling circuit wherein the cooling circuit is regulated by means of a redirecting element arranged above the nozzle fitting receiver and wherein the cooling circuit is being redirected or returned according to the position of the gas nozzle. Depending on the position and/or turning of the gas nozzle and the redirecting element, the cooling circuit may be routed into the gas nozzle as well, thus performing a cooling of the gas nozzle.

The redirecting element is positioned above the nozzle fitting receiver and is being turned together with the gas nozzle. It has been proven particularly advantageous for the gas nozzle to be removable in the basic position while avoiding a leaking of coolant at the same time. This is accomplished by the fact that the opening of the first level of the redirecting element is aligned with the inlet opening of the nozzle fitting receiver and then the coolant introduced over this way is redirected radially to the opposite side and introduced into the outlet opening of the nozzle fitting receiver at the opposite opening of the first level. By doing so, the coolant is routed through the redirecting element and then returned directly. In this case the gas nozzle is not being cooled. At the same time, the openings of the second cooling duct are not positioned above the inlet opening of the nozzle fitting receiver. It is thus not possible for coolant to flow into the second cooling duct and subsequently continue to flow into the gas nozzle in order to allow cooling the gas nozzle. As a result, the flow passes either through the first cooling duct or through the second cooling duct in the redirecting element. It has further been proven particularly advantageous that no separate locking of the coolant supply and/or the coolant return is required in order to replace the gas nozzle. The locking of the coolant supply is done simply by turning the gas nozzle into the basic position. Another advantage here is that this prevents an undesired leaking of the coolant.

A further advantage in this respect is that the redirecting element is designed in the form of multiple parts, thus allowing different designs of the cooling ducts.

In a further advantageous embodiment of the device according to the invention, a forced path is provided in the redirecting element, making it possible to increase creepage current resistance. As a consequence, electrochemical corrosion, which may lead to damage on the nozzle fitting receiver and other substantial elements of the welding torch, is reduced considerably.

A similar advantage is that the redirecting element may be made of an electrically insulating and/or non-conductive material. This will make the aforementioned effect possible and further widen the selection of conceivable materials with respect to the intended use.

In a schematic manner,

Figure 1:
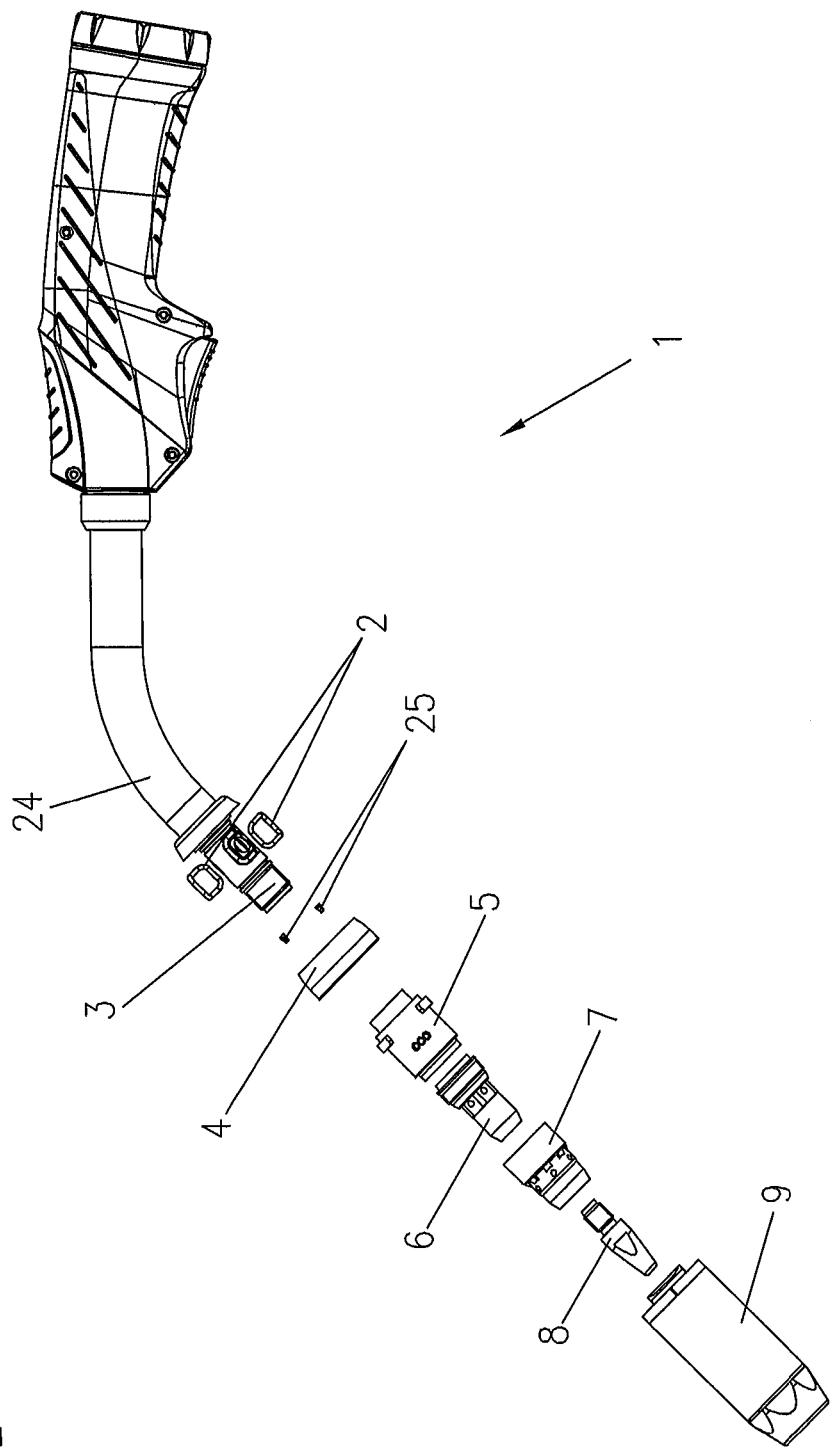
FIG. 1 shows the cooled welding torch with the device according to the invention in an exploded view.

FIG. 1 shows the cooled welding torch 1 for performing a gas-shielded welding process in an exploded view. The basic arrangement is formed based on a torch neck 24. Adjoining the torch neck 24, a nozzle fitting receiver 3 is arranged. An inlet opening 29 and an outlet opening 30 are integrated into it. Next, locking pins 25, to be included between a gas nozzle receiver 4 and the torch neck 24 in order to secure a redirecting element 5 against turning, are illustrated. The redirecting element 5 is fitted onto the nozzle fitting receiver 3. This redirecting element 5 is used to produce the effect according to the invention by creating either a shortened cooling circuit or an expanded cooling circuit, depending on the positions of the redirecting element 5 and the gas nozzle 9. The redirecting element 5 is always turned together with the gas nozzle 9 since the redirecting element 5 has elevations 10 that engage with corresponding recesses of the gas nozzle 9. As a consequence, the redirecting element 5 and the gas nozzle 9 must be turned together. The gas nozzle 9 is either cooled by the expanded cooling circuit or, if the shortened cooling circuit is present, no cooling of the gas nozzle 9 occurs and the coolant is returned by the redirecting element 5 before it could reach the gas nozzle 9. This means that the shortened cooling circuit is active when the gas nozzle 9 has been removed because the cooling circuit is returned directly within the redirecting element 5. Thus, the gas nozzle 9 may be removed without causing a leaking of coolant. Regardless of this, the cooling circuit is always present since the redirecting element 5 is designed to maintain the cooling circuit at all times. Locking the coolant supply or the coolant return is not required since the redirecting element 5 either forwards the coolant flow into the gas nozzle 9 or returns it directly if the gas nozzle 9 has been removed. In this way, the cooling circuit is maintained at all times. The redirecting element 5 is secured axially by the nozzle fitting 6. This prevents an axial displacement of the redirecting element 5 from the basic position. A radial turning of the redirecting element 5, however, is still possible. Sealing elements 2 are provided between the redirecting element 5 and the nozzle fitting receiver 3 in order to create a seal between the two components and prevent coolant from leaking. A spatter protection 7 for avoiding adhesion of welding spatter is fitted onto the nozzle fitting 6. Adjoining the nozzle fitting 6, a contact pipe 8 is provided for guiding the welding wire (not shown) therethrough and contacting it. At the end, the gas nozzle 9 can be seen in the overview. By means of elevations on the attachment side of the gas nozzle 9, it may engage with corresponding recesses in the gas nozzle receiver 4 in order to be secured. Virtually any fluid, e. g. water, may be used as the coolant.

Figure 2:
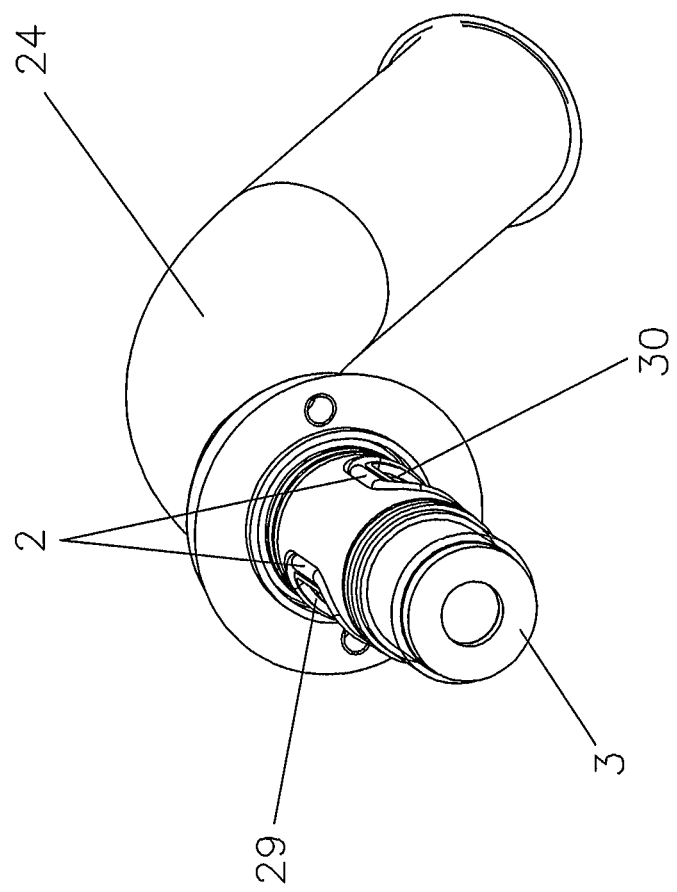
FIG. 2 shows the torch neck with the inlet opening and the outlet opening in the nozzle fitting receiver.

FIG. 2 shows the torch neck 24 and the nozzle fitting receiver 3 in detail. It can be seen that the nozzle fitting receiver 3 comprises an inlet opening 29 and an outlet opening 30. Furthermore, the sealing elements 2, which are required to provide a seal between the redirecting element 5 located at the nozzle fitting receiver 3 and the nozzle fitting receiver 3 itself in order to avoid an undefined leaking of coolant, can be seen as well. The inlet opening 29 and the outlet opening 30 of the nozzle fitting receiver 3 are used to supply and transfer, respectively, the coolant and/or cooling fluid, which is then routed through the redirecting element 5. It can also be seen that the inlet opening 29 and the outlet opening 30 are provided radially opposite each other in order to produce the effect according to the invention.

Figure 3:
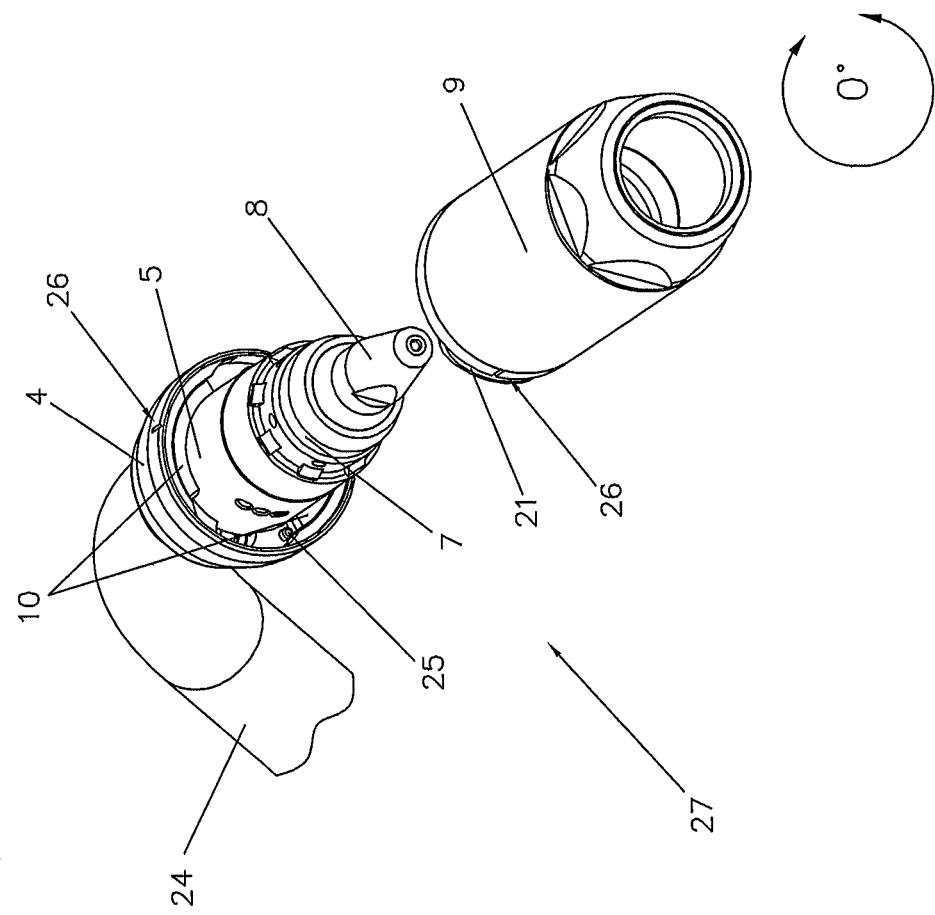
FIG. 3 shows an exploded view of the gas nozzle and the redirecting element in the basic position.

FIG. 3 shows an exploded view of the gas nozzle 9 and the redirecting element 5 in the basic position 27. In general, the basic position is defined to have a turn of 0 degrees. In this basic position 27, the cooling circuit extends within the redirecting element 5. The notches 26 are not aligned with each other and/or are offset by 90°. The redirecting element 5 is positioned such that one of the two elevations 10 is locked between locking pins 25. In this position, the gas nozzle 9 may also be attached and/or removed without turning the redirecting element 5. The gas nozzle 9 is thus fitted onto the redirecting element 5 until it abuts the gas nozzle receiver 4. During the attachment of the gas nozzle 9, the locking pins 25 are pressed down and/or to the inside by the elevations 21 of the gas nozzle 9. The lock is thus released and the redirecting element 5 may be turned together with the gas nozzle 9.

Figure 4:
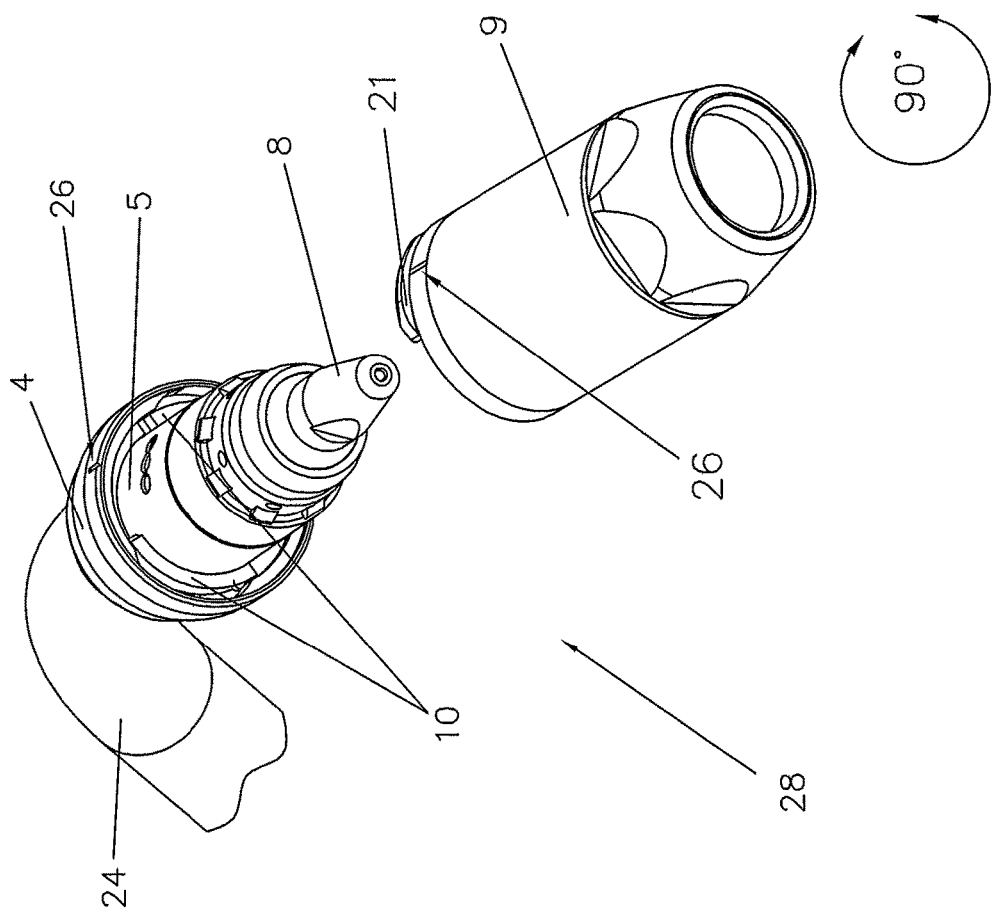
FIG. 4 shows an exploded view of the gas nozzle and the redirecting element in the locked position.

FIG. 4 shows an exploded view of the gas nozzle 9 and the redirecting element 5 in the locked position 28. In this locked position 28, the cooling circuit extends through the redirecting element 5 into the gas nozzle 9. Here, the redirecting element 5 and the gas nozzle 9 are arranged in such a way that they are positioned offset by a quarter of a turn. This means that, in general, the locking position 28 is defined by a 90-degree turn with respect to the basic position 27. In this position the notches 26 are aligned with each other. The redirecting element 5 has been turned together with the gas nozzle 9. The turn itself is possible because the locking pins 25 are pressed down by the gas nozzle 9, as has been described in FIG. 3, thus allowing a turn. Consequently, the elevations of the gas nozzle 9 engage with the spaces between the elevations 10 of the redirecting element 5, so substantially the elevations are forming a circle and may be turned together. The turning angle of 90 degrees is relevant in so far as this turn allows positioning the redirecting element 5 in order to establish a cooling circuit through the gas nozzle 9.

Figure 5:
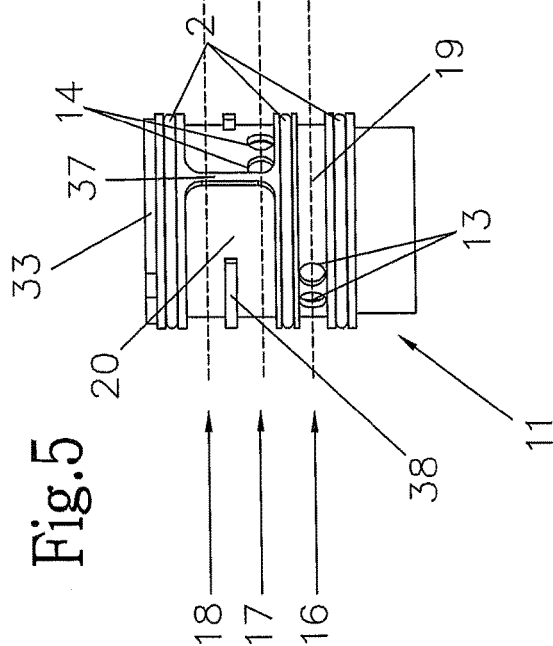
FIG. 5 shows the inner ring of the redirecting element with the respective openings for the coolant flow and the three levels.

FIG. 5 shows the inner ring 11 of the redirecting element 5. Basically, the redirecting element 5 is comprised of the inner ring 11 and the outer ring 12, i.e. of two parts. The inner ring 11 has openings for the coolant flow. In general, all openings of the redirecting element 5 may be designed as single openings or in the form of multiple openings provided directly adjacent each other. On the first level 16, the openings 13 of the first cooling duct 19 are arranged. On the second level 17, the openings 14 of the second cooling duct 20 are arranged. The second cooling duct 20 extends over two levels. The second level 17 and the third level 18 together comprise the second cooling duct 20. The third level 18 does not have openings in the inner ring 11. It is essential for the second cooling duct 20 not to be flushed in a close circuit, in contrast to the first cooling duct 19. The second cooling duct 20 is separated by two partition walls 37. These partition walls 37 are used to separate the coolant supply and the coolant return from one another. The second cooling duct 20 includes a forced path 31 which the coolant has to pass, allowing an increase in the creepage current resistance. The prerequisite for this is flushing the second cooling duct 20, which is accomplished in the locked position 28. In this case, the opening 14 is located above the inlet opening 29 of the nozzle fitting receiver 3. Coolant flows through the inlet opening 29 of the nozzle fitting receiver 3 through the openings 14 of the second level 17. Then, the coolant flows radially along the second cooling duct 20, which is divided in its centre by a horizontal partition wall 38. The second cooling duct 20 is radially divided by vertical partition walls 37 in order to create two separate regions, one for the supply and another one for the return.

Figure 6:
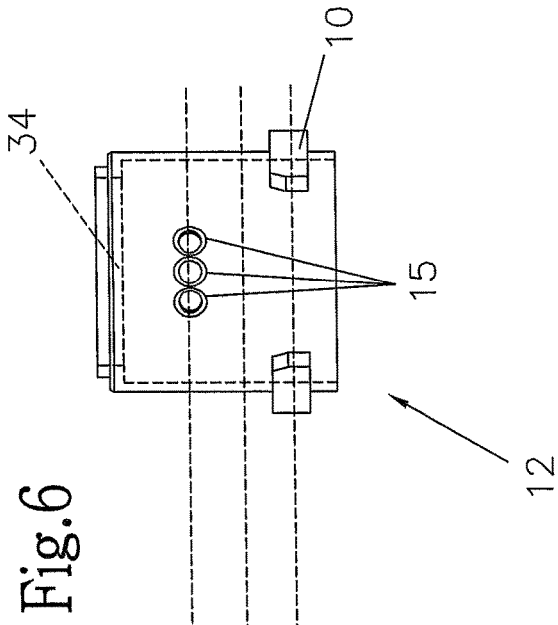
FIG. 6 shows the outer ring of the redirecting element with the respective openings for the coolant flow and the three levels.

FIG. 6 shows the outer ring 12 of the redirecting element 5. In FIG. 5 it can be seen that the third level 18 has openings 15 for the coolant to flow in (supply) and/or flow out (return). Together, the inner ring 11 and the outer ring 12 form the redirecting element 5. On the front side 33 of the inner ring 11 an oval elevation is provided, and on the inside 34 of the outer ring 12 there is an oval recess. The oval elevation and/or the oval recess serve to secure the position of the inner ring 11 with respect to the position of the outer ring 12. This is accomplished by the oval elevation and the oval recess engaging with each other during the joining of the inner ring 11 and the outer ring 12, so the rings 11, 12 cannot be turned against each other. The positions of the rings 11, 12 with respect to one another are relevant for generating the functions of the cooling circuits as desired. The situation of positioning the inner ring 11 and the outer ring 12 by means of the oval elevation and/or recess has not been illustrated.

Figure 7:
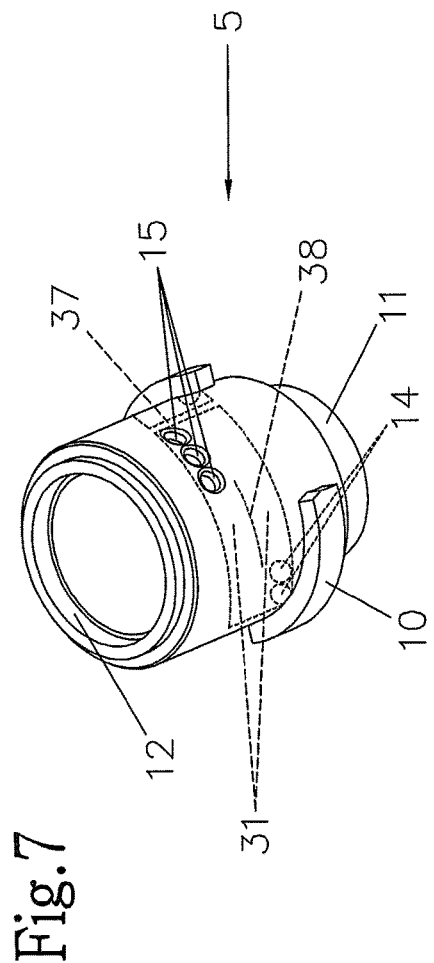
FIG. 7 shows the redirecting element in a full view.

FIG. 7 shows the redirecting element 5 in a full view. Here it can be seen how the inner ring 11 and the outer ring 12 together form the redirecting element 5. The openings 15 on the third level 18 can also be seen. Coolant flows through these openings 15 after passing through the second cooling duct 20 from the second level 17 to the third level 18. The elevations 10 of the redirecting element 5 can be seen as well. These elevations 10 are used to accomplish the correct positioning of the redirecting element 5 as at least one of the elevations 10 is locked between the locking pins 25. In this way, the entire redirecting element 5 is held in a particular position and cannot be turned. This position corresponds to the basic position 27.

In FIG. 7 it can also be seen how the forced path 31 is designed in terms of construction. The openings 14 and the openings 15 are located diagonally to each other since they are provided in different levels as well as radially offset from one another. Coolant enters the second cooling duct 20 on the second level 17 through the openings 14. Then the coolant flows to the openings 15 on the third level 18 via two L-shaped paths. This means that in the first L-shaped course, the coolant flows from the second level 17 to the third level 18 and then continues radially towards the openings 15. In the second L-shaped course, the coolant first flows radially along the second level 17 and then, at the end of the forced path 31, flows to the third level 18. Finally, the coolant flowing from both of the L-shaped courses exits via the openings 15. The L-shaped course is created by a horizontal partition wall 38 dividing the second cooling duct 20 in the centre of the duct. This division is essential in order to guarantee an increased stability of the inner ring 11 as well, since otherwise it might buckle when being joined with the outer ring 12. The vertical partition walls 37 are used to create two forced paths 31, one path for the supply and another one for the return, arranged radially opposite each other.

Figure 8:
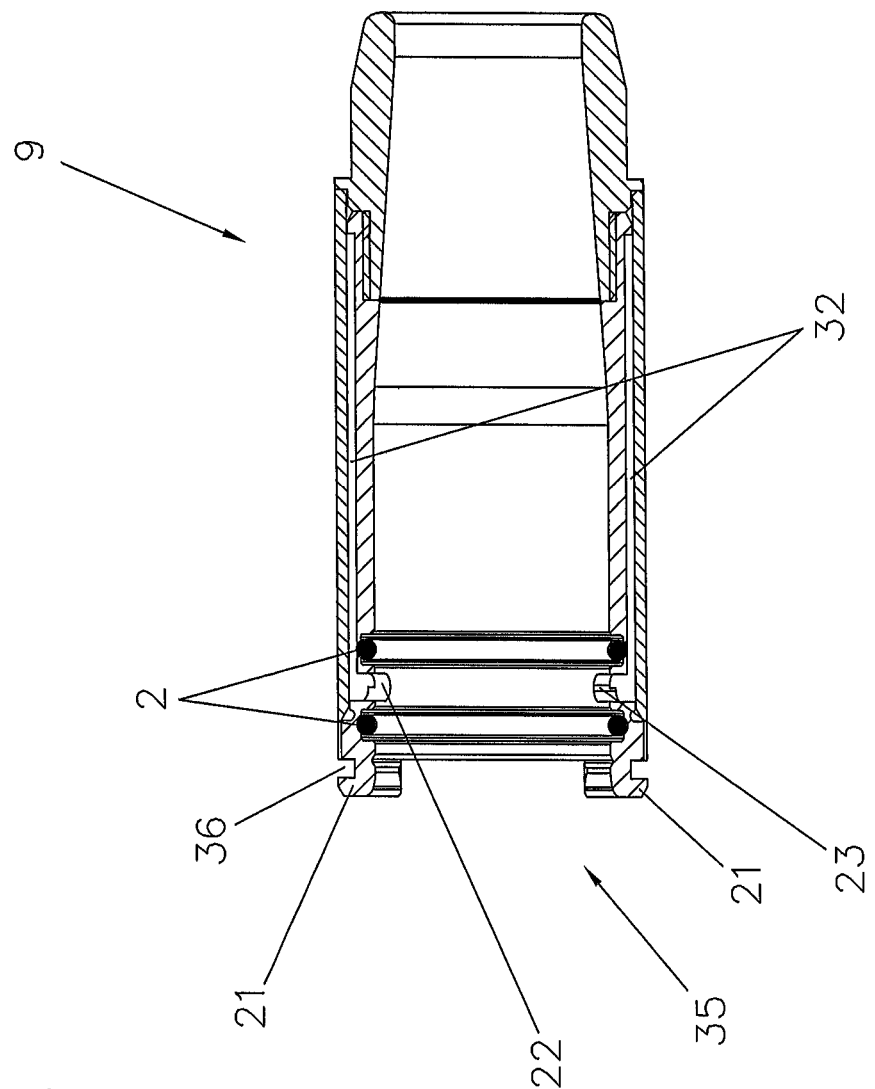
FIG. 8 shows a sectional view of the gas nozzle with the respective openings for the coolant flow.

FIG. 8 shows a sectional view of the gas nozzle 9 in detail. Elevations 21 that engage with the corresponding openings of the gas nozzle receiver 4 when turning the gas nozzle 9 are provided on the attachment side 35 of the gas nozzle 9. Furthermore, it is possible to see the inlet opening 22 of the gas nozzle 9 and the outlet opening 23 of the gas nozzle 9 through which the coolant enters and exits, respectively. During attachment, the elevations 21 of the gas nozzle 9 engage with the lateral recesses of the redirecting element 5. The lateral recesses are the spaces between the elevations 10 of the redirecting element 5. In this way, it is now possible to turn the gas nozzle 9 together with the redirecting element 5 as both elements engage one another. During the turn, the U-shaped recesses 36 of the elevations 21 engage with the corresponding recesses of the gas nozzle receiver 4 so a fixing of the gas nozzle 9 and the redirecting element 5 is accomplished. The recesses of the gas nozzle receiver 4 are not represented by illustration.

Figure 9:
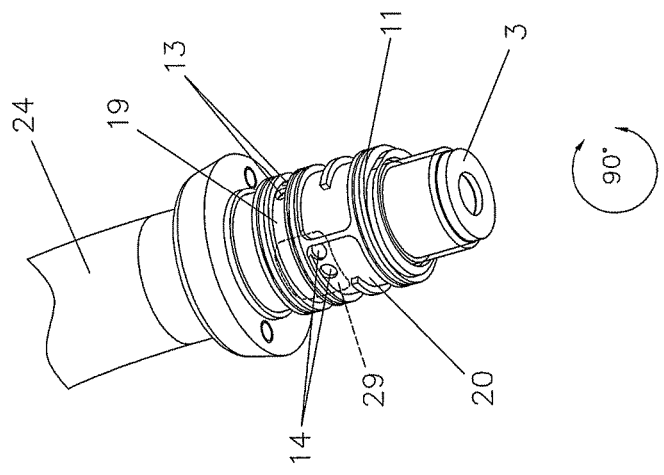
FIG. 9 shows the torch neck with the arrangement of the inner ring on the nozzle fitting receiver in the basic position.

FIG. 9 shows the nozzle fitting receiver 3 with the inner ring 11 in the basic position 27. Here it can be seen how the inner ring 11 and then the redirecting element 5 are positioned on the nozzle fitting receiver 3. The inner ring 11 is fixed in the basic position 27. Only the openings 13 of the first level 16 of the first cooling duct 19 are located above the inlet opening 29 and/or the outlet opening 30 of the nozzle fitting receiver 3. In this position, coolant enters the first cooling duct 19. Following this, the coolant is redirected through the first cooling duct 19 to the radially opposite side, with the coolant flowing to the opposite side accordingly in both directions. At this point, the coolant exits towards the outlet opening 30 of the nozzle fitting receiver 3 located directly below since the outlet opening 30 of the nozzle fitting receiver 3 and the openings 13 of the first level 16 are arranged to be aligned in the basic position 27. In this way, the coolant is returned and does not reach the gas nozzle 9. At the same time, however, the cooling circuit is maintained since no locking of the cooling circuit occurs. The coolant is merely redirected in a radial manner on the first level of the redirecting element 5 before being returned. This allows to remove the gas nozzle 9 without requiring a separate locking of the coolant supply and/or return while avoiding an undesired leaking of coolant as well.

Figure 10:
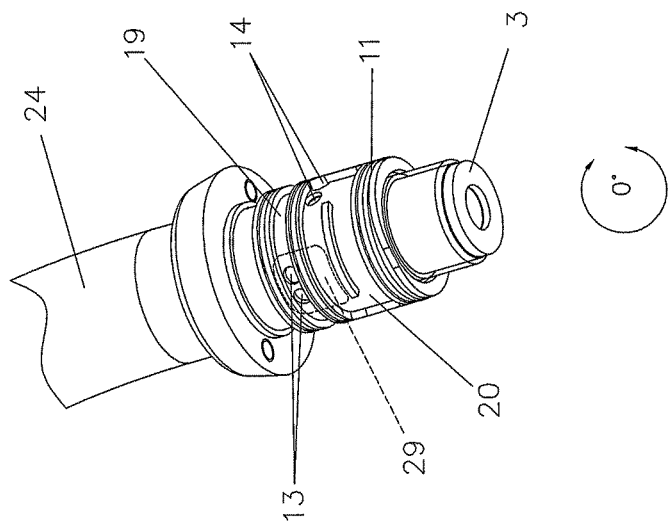
FIG. 10 shows the torch neck with the arrangement of the inner ring on the nozzle fitting receiver in the locked position.

FIG. 10 shows the nozzle fitting receiver 3 with the inner ring 11 in the locked position 28. Here, the inner ring 11 and, consequently, the redirecting element 5 have been turned by 90 degrees with respect to the basic position 27. In this position, only the openings 14 of the second level 17 of the second cooling duct 20 are located directly above the inlet opening 29 of the nozzle fitting receiver 3. At this point, coolant enters the second cooling duct 20. Following this, the coolant flows radially through the second cooling duct 20 to the third level 18. The second level 17 and the third level 18 together form the second cooling duct 20 and are not separated spatially from each other. Next, the coolant exits at the openings 15 of the second cooling duct 20 on the third level 18 towards the inlet opening 22 of the gas nozzle 9. The openings 15 of the second cooling duct 20 on the third level 18 are arranged directly adjacent each other opposite the inlet opening 22 of the gas nozzle 9. Subsequently, the coolant flushes the cavity 32 of the gas nozzle 9 so the gas nozzle 9 is being cooled. Afterwards, the coolant reaches the outlet opening 23 of the gas nozzle 9 and then travels directly to the openings of the second cooling duct 20 on the third level 18. The openings 15 of the third level 18 of the second cooling duct 20 are arranged directly adjacent each other opposite the outlet opening 23 of the gas nozzle 9. After this, the coolant flows through the second cooling duct 20 again, to the openings 14 of the second level 17, and then directly into the outlet opening 30 of the nozzle fitting receiver 3. The openings 14 of the second level 17 are arranged directly adjacent each other opposite the outlet opening 30 of the nozzle fitting receiver 3. Following this, the coolant is returned through the nozzle fitting receiver 3 and the torch neck 24, thereby closing the cooling circuit again.

Depending on whether the redirecting element 5 and/or the gas nozzle 9 are in the basic position 27 or the locked position 28, the flow passes either through the first cooling duct 19 or through the second cooling duct 20. While changing from the first cooling duct 19 to the second cooling duct 20 and/or vice versa, there is a transition area in which both cooling ducts 19, 20 are flushed for a short time. For example, the opening 13 of the first cooling duct 19 and the opening 14 of the second cooling duct 20 are both being flushed at the same time once the redirecting element 5 is turned from the basic position 27 to the locked position 28 together with the gas nozzle 9, but only at the start of the turn. As soon as the final configuration of the basic position 27 or the locked position 28 is reached, the flow passes through only one of the cooling ducts 19, 20 in any case, as the openings of the respective other cooling duct 19, are completely outside of the inlet opening 29 or the outlet opening 30 of the nozzle fitting receiver 3.

Figures 11, 12:
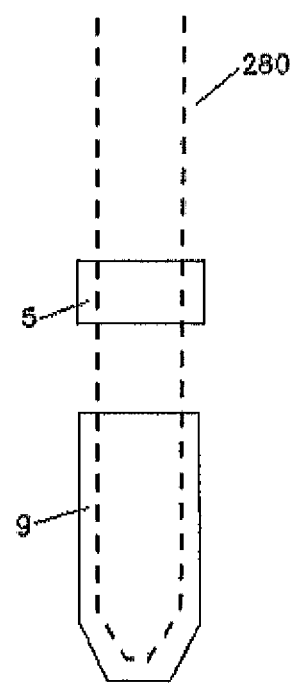
FIG. 11 shows a schematic view of the redirecting element and the gas nozzle in the basic position creating a shortened cooling circuit.
FIG. 12 shows a schematic view of the redirecting element and the gas nozzle in the locked position creating an expanded cooling circuit.

FIG. 11 shows a schematic view of the redirecting element 5 and the gas nozzle 9 in the basic position 27, wherein the cooling circuit ends in the redirecting element 5, thereby creating a shortened cooling circuit 270. FIG. 12 shows a schematic view of the redirecting element 5 and the gas nozzle 9 in the locked position 28, wherein the cooling circuit extends through the redirecting element 5 into the gas nozzle 9, thereby creating an expanded cooling circuit 280.

The invention claimed is:

1. A cooled welding torch (1) having a closed cooling circuit through which a coolant flows from a coolant supply line to a coolant return line, which closed cooling circuit extends via a nozzle fitting receiver (3) into a gas nozzle (9), and the gas nozzle (9) is attachable to the welding torch (1) by a defined turn, wherein the closed cooling circuit is routed through a redirecting element (5), which redirecting element (5) is positioned above the nozzle fitting receiver (3) and is turned together with the gas nozzle (9), wherein a path of the closed cooling circuit is switchable by a position of the gas nozzle (9) between a basic position (27), wherein the coolant flows from the coolant supply line through the redirecting element (5) and back to the coolant return line in a shortened cooling circuit (270) in which the coolant does not flow through the gas nozzle (9), thereby permitting removal of the gas nozzle (9) without leaking of the coolant, and a locked position (28), wherein the coolant flows through the redirecting element (5) into the gas nozzle (9) in an expanded cooling circuit (280), depending on the position of the redirecting element and the gas nozzle.

2. The welding torch (1) according to claim 1, wherein the redirecting element (5) comprises an inner ring (11) and an outer ring (12).

3. The welding torch (1) according to claim 2, wherein the redirecting element (5) comprises a first cooling duct (19) and a second cooling duct (20), which are created by joining the inner ring (11) and the outer ring (12).

4. The welding torch (1) according to claim 3, wherein the first cooling duct (19) has openings (13) in the first level (16).

5. The welding torch (1) according to claim 3, wherein the second cooling duct (20) has openings (14) in the second level (17) and openings (15) in the third level (18).

6. The welding torch (1) according to claim 4, wherein in the basic position (27) of the gas nozzle (9) the openings (13) of the first cooling duct (19) in the first level (16) are located above the inlet opening (29) and/or the outlet opening (30) of the nozzle fitting receiver (3).

7. The welding torch (1) according to claim 5, wherein in the locked position (28) of the gas nozzle (9) the openings (14) of the second cooling duct (20) in the second level (17) are located above the inlet opening (29) and/or the outlet opening (30) of the nozzle fitting receiver (3).

8. The welding torch (1) according to claim 5, wherein the openings (15) of the second cooling duct (20) of the third level (18) are arranged adjacent each other opposite to the inlet opening (22) and/or the outlet opening (23) of the gas nozzle (9).

9. The welding torch (1) according to claim 1, wherein the redirecting element (5) has elevations (10), which are locked by locking pins (25) in the gas nozzle receiver (4) in the basic position (27).

10. The welding torch (1) according to claim 3, wherein the first cooling duct (19) and the second cooling duct (20) are sealed against each other by sealing elements (2).

11. The welding torch (1) according to claim 1, wherein the redirecting element (5) is made of an electrically insulating material.

12. The welding torch (1) according to claim 1, wherein the redirecting element (5) comprises a forced path (31).

* * * * *